Nov. 6, 1951  N. S. REYNOLDS  2,574,062
SEAL CONSTRUCTION
Filed Aug. 5, 1946

INVENTOR.
Noel S. Reynolds
BY
ATTORNEY

Patented Nov. 6, 1951

2,574,062

UNITED STATES PATENT OFFICE 2,574,062

SEAL CONSTRUCTION

Noel S. Reynolds, St. Louis, Mo.

Application August 5, 1946, Serial No. 688,521

8 Claims. (Cl. 286—5)

This invention relates to seals and more particularly to an improvement in seals employing a flexible sealing lip maintained in sealing engagement with an annular surface by means of a spring.

One of the objects of my invention is to so construct a seal of the type having a sealing lip held in sealing engagement with an annular surface by means of a spring that said lip will maintain sealing pressure notwithstanding spring distortion caused by shock vibration or eccentric movement of the annular surface due to worn bearings.

Another object of my invention is to produce an improved diaphragm for use with annular springs for applying sealing pressure to the sealing lip of the diaphragm.

A further and more specific object is to so embody in a diaphragm for a seal a thrust bearing means of woven or perforated material, or the equivalent, that it will cause proper control of the sealing pressure of the sealing lip associated with the diaphragm and yet not interfere with proper flexing of the diaphragm.

Another object is to so embody in the diaphragm of a seal a non-expansible ring which will lie close to the shaft and be provided with a thin coating of yieldable and flexible material and function to hold the diaphragm concentric near the sealing lip to thereby prevent the lip from having eccentricity or distortion.

Other objects of the invention will become apparent from the following description taken in connection with the accompanying drawings in which.

Figure 1:
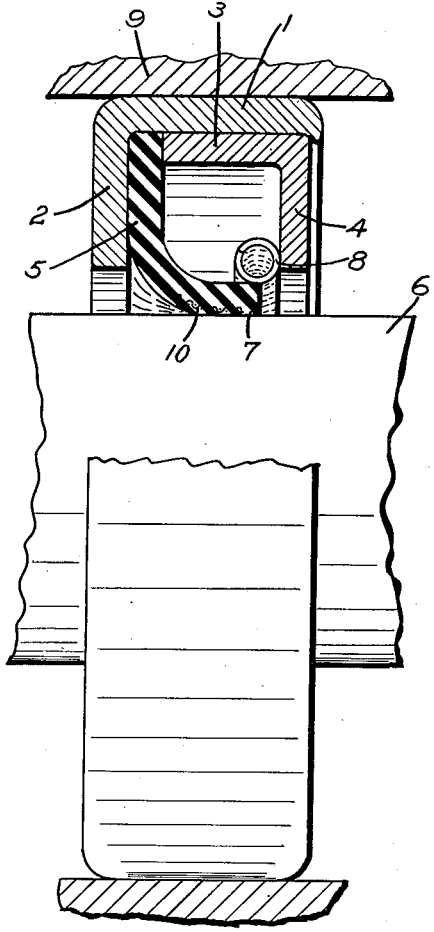
Figure 1 is a side view of a seal, partly in section, embodying my invention, said seal being shown associated with a shaft.
Figure 2:
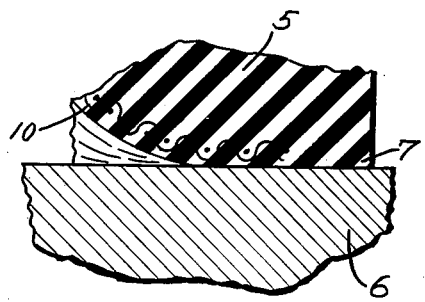
Figure 2 is an enlarged sectional view of the sealing lip part of the seal.

Referring to the drawings in detail and first to Figures 1 and 2, there is disclosed, by way of example, a well known seal assembly in which is embodied my invention. As shown, the seal is provided with frame means comprising an outer cylindrical member 1 provided with a flange 2 at one end. Into this member 1 is telescoped a second cylindrical member 3 having an end flange 4. The members 1 and 2 may be made from any suitable rigid material such as steel, copper, brass, alloys, etc., or even plastic material. Between the flange 2 of member 1 and the non-flanged end of member 2 is clamped the outer marginal portion of an annular diaphragm member 5 made of a suitable flexible and resilient material such as rubber or a rubber-like synthetic material properly compounded. The clamping action is maintained by turning over the non-flanged end of member 1 onto the flanged end of member 2.

The diaphragm member 5 has a curved cross section so as to be sleeved out in an axial direction when in operative position surrounding a shaft, such as shaft 6, with which the seal is to be associated. The inner end portion of this diaphragm, which is a continuous part thereof, is adapted to engage the shaft and the end edge provides a sealing lip 7. The diaphragm is of such axial length that the sealing lip is substantially radially opposite the flange 4 of the frame member 3. In order that this sealing lip may be maintained in sufficient pressure sealing engagement with the shaft surface the inner end portion of the diaphragm has surrounding it a garter spring 8. The garter spring is held on the end of the diaphragm by the flange 4 as shown. Other types of springs can be employed if desired. When the seal is in operative position the outer cylindrical member 1 of the frame means is simply fitted into a bore of a fixed member 9, such as a housing, which surrounds the shaft 6.

The seal structure just described has been fairly successfully used for a number of years. It has, however, shown a tendency toward inefficient sealing when there is eccentric movement between the shaft and the frame means on the fixed housing, as will occur when the shaft bearing becomes worn. Such eccentric movement causes the spring to distort from shock and the result is that uniform sealing pressure of the sealing lip on the shaft will not be maintained. Also high shaft speed, where the shaft has eccentric movement, will tend to make the sealing end of the diaphragm "out of round" which cannot be corrected because of spring inertia. This also results in leaking at the sealing lip.

In order to eliminate this inefficiency of the seal, I associate with the diaphragm a thrust bearing ring means which is arranged to be closely positioned adjacent the sealing lip and to ride on the shaft. This thrust bearing means is substantially non-expansible, thus the sealing lip will be prevented from getting "out of round" with attendant spring distortion. The thrust bearing ring means is formed by embedding an annular member 10 of woven strands in the diaphragm material. A preferred material is wire screen, but other material such as fabric woven from relatively non-stretchable strands is also within the scope of my invention. Other annular members of rigid material having perforations for embedding can also be used. This annular screen or fabric or perforated material is originally shaped to have substantially the same cross sectional curvature as the diaphragm has from a point somewhat back of the sealing lip to a point less than substantially one-half the distance to the clamped outer marginal edge portion of the diaphragm. The size and curvature is also such that when the screen is embedded in the material of the diaphragm during molding it will lie closely adjacent the surface which is to be next to the shaft surface. Thus there will be only a thin layer of the flexible and resilient material of the diaphragm between the woven material and the surface which will be engaged by the shaft, particularly that surface adjacent the sealing lip. The screen or equivalent means will give a rigidity and non-expansibleness to the diaphragm adjacent the sealing lip and since some of the screen will be radially opposite a surface of the diaphragm engaging the shaft surface, "out of round" tendencies will be opposed. By having the screen embedded in only a part of the diaphragm and only that part which is relatively close to or engaging the shaft, the comparative free flexing of the diaphragm adjacent the outer edge portion clamped to the frame means is not interfered with. Thus there will be no additional opposition to the eccentric movement of the shaft which will cause more rapid wear at the sealing lip. Since none of the screen or equivalent material engages the shaft there will be no excessive shaft wear or scoring. The construction results in a thrust bearing ring having a rubber coated bearing surface. The flexibility of the lip 7 will not be interfered with. The lip will be maintained in pressure engagement with the shaft surface by the spring 8 acting directly on the sealing lip edge as shown. I am aware it has been previously proposed to embed fabric in a diaphragm, but in such instances the fabric has extended throughout the diaphragm. Such is incapable of obtaining my result as free flexing of the diaphragm is interfered with.

Figure 3:
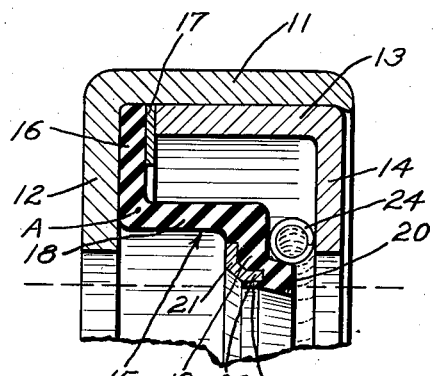
Figure 3 is a sectional view of a modified seal construction.

In Figure 3 there is shown a slightly modified seal structure. The change in construction over that of Figure 1 resides primarily in the shape of the diaphragm in order to obtain better free flexing of the diaphragm and also to prevent such pulling on the lip that it will tend to cause tilting thereof. The lip construction is also somewhat modified. The seal has an outer cylindrical member 11 provided with a flange 12. Into this cylindrical member is telescoped a second inner cylindrical member 13 having a flange 14. The diaphragm 15 is arranged to have at one end an outwardly extending portion 16 which is clamped between the flange 12 of the outer cylindrical member and the inner end of the inner cylindrical member. There is also provided an annular washer 17 between the inner end of the inner cylindrical member 13 and the portion 16 of the diaphragm in order to provide a greater clamping surface and thus insure better sealing at this clamped portion. The central portion or web 18 of the diaphragm is arranged to be cylindrical in shape and to have substantial axial length. The outer or free end of the web has an inwardly extending flange portion 19 from which extends the sealing lip 20 for the seal which is arranged to ride upon the shaft when the seal is mounted in the fixed housing. The surface of the shaft is indicated by a broken line.

The flange portion 19 and an adjacent part of the lip of the diaphragm has associated therewith an annular bearing 21 of L-shaped cross section. The axial flange portion 22 of this bearing is of larger internal diameter than the diameter of the shaft upon which the seal is to be mounted and this flange portion 22 is embedded in the diaphragm flange portion 19 so that its inner surface is covered by a thin coating of rubber indicated by the numeral 23. The result is a rubber coated thrust bearing surface acting similar to the bearing surface of the seal of Figure 1. The rubber coated thrust bearing surface rides on the shaft and causes the lip to move with the shaft and not become "out of round" and permit leakage when there is eccentric movement of the shaft. The rubber coated bearing surface insures that there will be no excessive shaft wear or scoring. The sealing lip, which is freely flexible insofar as the thrust bearing is concerned, is maintained against the shaft by the garter spring 24 positioned as shown.

The cylindrical intermediate portion or web 18 of the diaphragm is an important feature of the seal shown in Figure 3. It permits full free flexing of the diaphragm and the portion including the lip which engages the shaft is better able to follow any eccentric movement of the shaft without any pulling effect on the clamped outer portion of the diaphragm. Also, with this cylindrical portion or web, the diaphragm will swing about the annular axis A as it follows the eccentric movement and because of this there will be no tendency of a pulling on the sealing lip in opposite directions on opposite sides of the shaft and thus cause a tilting of the portion of the diaphragm including the lip which engages the shaft. In other words, when the shaft has eccentric movement the diaphragm for any instant position of the shaft will swing outwardly about the axis A on one side of the shaft and inwardly about the axis A on the opposite side of the shaft. This will tend to shorten the effective length of opposite sides of the web and thus any tendency to pull on the lip will be in the same axial direction on both sides of the shaft. Thus tilting will not take place. In a seal such as that shown in Figure 1 the action will not be the same on the sealing lip since when eccentric movement takes place the sealing lip on one side of the shaft will be forced in one axial direction and the sealing lip on the opposite side of the shaft will be forced in the opposite axial direction by the diaphragm. This will tend to cause a tilting of the portion of the seal which engages the shaft and consequently the sealing action is interfered with.

Figure 4:
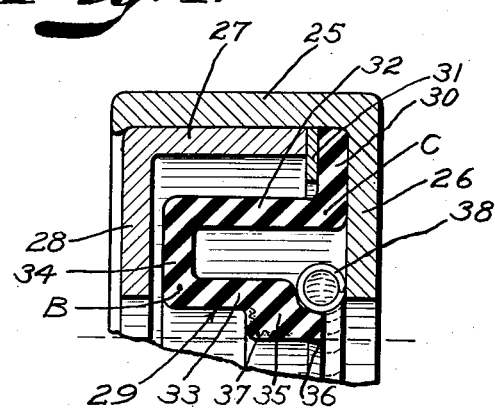
Figure 4 is a sectional view of another modified seal construction.

In Figure 4 another seal construction is shown which is quite similar to that of Figure 3, the essential difference being in the construction of the diaphragm. In this seal of Figure 4 there is provided an outer cylindrical member 25 provided with an inwardly extending flange at one end. Secured within this outer cylindrical member is an inner cylindrical member 27 having an inwardly extending flange 28. The diaphragm 29, of suitable flexible and resilient material, has an integral clamping flange portion 30 which is held between the flange 26 of the outer cylindrical member 25 and the inner end of the inner cylindrical member 27. An annular washer 31 is employed to provide a greater clamping action. The diaphragm is constructed to have two concentric cylindrical portions or webs 32 and 33 which are joined together by an integral portion 34. The inner cylindrical web is provided with an inwardly extending portion 35 from which projects a sealing lip 36. The inwardly extending portion 35 has embedded therein a woven member 37 of L-shaped cross section, such as metal screen, to provide a thrust bearing portion having relatively non-expansible characteristics. The screen is molded into the diaphragm and is of such a size and shape that it will lie close to the inner surface of the extending portion 35. Thus there will be a thin layer of the flexible and resilient diaphragm material between the screen and the shaft. The result will be a rubber coated thrust bearing surface for riding on the shaft and its function will be the same as the thrust bearing 21 in the seal of Figure 3 and the thrust bearing formed by the screen in the seal of Figure 1. A garter spring 38 is shown as being positioned between the inwardly extending portion 35 of the diaphragm and the flange 26 of the outer cylindrical member 25 which is employed to maintain the sealing lip 36 against the shaft, which sealing lip is free to flex with respect to the thrust bearing provided by the embedded screen member 37. The two concentric cylindrical webs 32 and 33 function in the same manner as the cylindrical web 18 of Figure 3 in order to prevent any pulling on the sealing lip as the shaft has eccentric movement. By employing two cylindrical webs a greater flexibility is permitted and each web will require less flexing as the eccentric movement of the shaft takes place. During the eccentric movement the inner web will tend to pivot about the annular axis indicated at B and the outer web will tend to pivot about the annular axis indicated at C.

In the seal of Figure 4 it is of course obvious that in place of the screen 37 a bearing ring such as that shown at 21 in Figure 3 could be employed. It is also obvious that if a suitable bearing material is available which does not produce any appreciable wear or scoring of the shaft, that the sealing ring can be so attached to the diaphragm that it will ride directly on the shaft and no thin rubber coating on its inner surface will be necessary. It is also obvious that the seals which are shown in the various figures can have their parts reversed so that the lips, instead of cooperating with the outer surface of a solid rotating shaft, can cooperate with an inner cylindrical surface.

Thus being aware of the possibility of modification in the structures shown and described without departing from the fundamental principles of my invention, I do not intend that the scope thereof be limited in any manner except as set forth by the appended claims.

What is claimed is:

1. In a seal construction for association with two relatively rotatable members one of which is provided with a cylindrical surface, said seal comprising a frame means, an annular diaphragm of flexible and resilient material having one end secured to the frame means and its other end portion arranged to have a substantial length ride on the cylindrical surface in sleeve-like relation with its end edge providing a sealing lip, means in the form of an annular perforated member embedded in the diaphragm material beginning adjacent to but spaced from the lip end edge and extending rearwardly for providing a relatively non-expansible thrust ring means for the said end portion of the diaphragm that has a substantial length riding on the cylindrical surface, the length and position of said perforated member being such as not to interfere with the normal free flexing of the diaphragm material for a substantial distance rearwardly thereof to the end secured to the frame means nor the normal yielding of the resilient material at the lip, and spring means acting to apply radial pressure on the sleeve-like portion and being so arranged that the maximum radial pressure will be at the lip end edge.

2. In a seal construction for association with two relatively rotatable members one of which is provided with a cylindrical surface, said seal comprising a frame means, an annular diaphragm of flexible and resilient material connected to the frame means and having a curved portion engaging the cylindrical surface at its end and also adjacent thereto to thereby form a sealing lip, thrust ring means comprising an annular member made from woven relatively non-stretchable material embedded in the diaphragm material closely adjacent the curved surface thereof on the side which is to be next to the cylindrical surface, said annular member extending rearwardly from a point spaced slightly from the lip edge over the curved portion engaging the cylindrical surface and stopping a substantial distance from the connection of the diaphragm with the frame means so as not to decrease the flexibility of said diaphragm adjacent to the frame means nor interfere with the normal yielding of the resilient material closely adjacent the lip edge, and spring means associated with the frame means and the diaphragm for applying a force for maintaining the lip together with an adjacent portion of the diaphragm having the thrust ring means in pressure engagement with the cylindrical surface.

3. In a shaft seal, an outer frame means, a single piece diaphragm of flexible material having its outer portion mounted in the frame means and its inner portion arranged to ride on the shaft in sleeve-like relation with the inner end providing a sealing lip, means embedded in the diaphragm material adjacent the lip end and extending toward the mounted outer portion for providing a relatively non-expansible thrust bearing ring means for the diaphragm, said means being so spaced from the mounted end of the diaphragm as to not interfere with the normal free flexing of the diaphragm for a substantial distance from the outer end which is mounted in the frame means nor interfering with the normal yielding of the flexible material at the lip end, and a spring means surrounding the lip end of the diaphragm for applying shaft engaging pressure to the lip and the adjacent portion of the diaphragm.

4. In a shaft seal, an outer frame means, a single piece diaphragm of flexible material having its outer portion mounted in the frame means and its inner portion arranged to ride on the shaft in sleeve-like relation with the inner end providing a sealing lip, an annular wire screen means embedded in the diaphragm material beginning at a point back of but adjacent the lip end and extending rearwardly for providing a relatively non-expansible thrust bearing ring means for the diaphragm, said wire screen means being of such axial length as to not interfere with the normal free flexing of the diaphragm for a substantial distance from the outer end which is mounted in the frame means nor interfering with the normal yielding of the material at the lip end, and a spring means surrounding the lip end of the diaphragm for applying shaft engaging pressure to the lip and the adjacent portion of the diaphragm.

5. In a shaft seal, an outer frame means, a single piece diaphragm of flexible material having its outer portion mounted in the frame means and its inner portion arranged to ride on the shaft in sleeve like relation with the inner surface adjacent the inner end providing a sealing lip, said outer portion and the inner portion being connected by a cylindrical portion of substantial length the diameter of which is greater than the shaft with which the seal is to be associated, and means comprising a perforated annular member embedded in the inner portion only of the diaphragm, said member being relatively non-expansible and arranged to lie close to the inner surface of the diaphragm material and to extend to a point spaced rearwardly of the sealing lip to thereby provide a thrust bearing means having thin diaphragm material for engaging and riding on the shaft to cause the lip to follow eccentric shaft movements but to not interfere with the normal yielding of the material at the lip.

6. In a seal, a frame adapted to be mounted on a support, a diaphragm of flexible and resilient material secured to the frame and provided with a sealing lip for engaging a rotating surface, and a non-expansible ring carried by the diaphragm adjacent the lip and providing a thrust bearing means, said ring being of such size and so embedded in the diaphragm material that there is established a thin coating of the diaphragm material between the ring and the rotatable surface for riding on said rotatable surface and said ring also being so embedded in the diaphragm as not to interfere with the free flexing of the diaphragm material forming the lip or the free flexing of the diaphragm material for a substantial distance from the point of securement to the frame toward the lip.

7. In a seal for association with two relatively rotatable members one of which is provided with a cylindrical surface, said seal comprising two portions one of which is provided with a yieldable sealing lip engaging the cylindrical surface and the other of which is associated with the other relatively rotatable member and a third cylindrical web portion connecting said two portions and having a substantial axial length and being in spaced relation to the said first named two portions, said web having one end connected to the portion provided with the lip at a point remote from the lip and the other end connected to the other of the two portions, and means providing a non-expansible thrust bearing portion on the said portion provided with the lip and between the lip and the connection with the cylindrical web portion for surrounding and riding on the cylindrical surface of the one relatively rotatable member, said sealing lip having such a normally formed diameter as to project radially beyond the thrust bearing portion so that when the seal is mounted for operation it will be flexed radially and have pressure engagement with the cylindrical surface.

8. In a seal for association with a shaft and comprising an outer portion for mounting on a fixed member, yieldable means providing a sealing lip of yieldable material for engaging the shaft surface, a flexible web connecting the sealing lip means with the outer portion and means comprising an annular member of relatively non-stretchable material with perforations embedded in the yieldable means beneath its shaft engaging surface and adjacent the sealing lip but forming no part of the lip and being so associated with the surface of the yieldable means as to provide a non-expansible thrust bearing ring having a bearing surface of the yieldable material to ride on the shaft and follow any eccentric movement thereof yet not interfere with the free flexing of the material of the web.

NOEL S. REYNOLDS.

REFERENCES CITED

The following references are of record in the file of this patent:

UNITED STATES PATENTS

| Number | Name | Date |
|---|---|---|
| Re. 18,829 | Nelson | May 9, 1933 |
| 1,869,021 | Perks | July 26, 1932 |
| 1,960,750 | Moore et al. | May 29, 1934 |
| 2,161,003 | Berman | June 6, 1939 |
| 2,213,116 | Bernstein | Aug. 27, 1940 |
| 2,385,941 | Reynolds | Oct. 2, 1945 |
| 2,482,029 | Reynolds | Sept. 13, 1949 |

FOREIGN PATENTS

| Number | Country | Date |
|---|---|---|
| 877,957 | France | of 1943 |